United States Patent [19]
Glover

[11] 3,791,679
[45] Feb. 12, 1974

[54] PIPE FITTINGS

[75] Inventor: John Benjamin Glover, Stocksbridge, England

[73] Assignee: The Hepworth Iron Company Limited, Sheffield, England

[22] Filed: Dec. 3, 1971

[21] Appl. No.: 204,518

[30] Foreign Application Priority Data
Dec. 18, 1970 Great Britain .................... 60315/70

[52] U.S. Cl. ................. 285/155, 285/156, 285/405, 285/423
[51] Int. Cl. ............................................. F16l 41/00
[58] Field of Search ... 285/155, 179, 150, 423, 156, 285/288, 230, 237, 238, 405; 138/172, 173

[56] References Cited
UNITED STATES PATENTS

| | | | |
|---|---|---|---|
| 1,025,186 | 5/1912 | Hill | 138/172 X |
| 1,037,709 | 9/1912 | Zeig | 138/172 X |
| 1,195,830 | 8/1916 | McWane | 138/172 |
| 2,641,491 | 6/1953 | Mueller et al. | 285/15 |
| 567,231 | 9/1896 | Glauber | 285/237 |
| 2,205,697 | 6/1940 | Sharpenberg | 285/237 |

FOREIGN PATENTS OR APPLICATIONS

| | | | |
|---|---|---|---|
| 1,229,981 | 9/1960 | France | 285/155 |
| 150,686 | 11/1931 | Switzerland | |

OTHER PUBLICATIONS

Catalog–Midwest Piping, 1450 So. Second St., St. Louis, 4, Missouri; Copyright 1962. Outside Cover Picture Showing Rib-Reinforced Valve Bodies Cited.

Primary Examiner—James R. Boler
Assistant Examiner—Wayne L. Shedd

[57] ABSTRACT

A pipe fitting, especially a pipe junction, is formed of resilient plastics material and has sockets integrally joined by tubular necks to a hollow body, which is stiffened by longitudinal ribs extending between collars adjacent the necks and circumferential ribs connecting the longitudinal ribs, so that the load-bearing capacity is comparable with that of pipes, especially clayware pipes, which it is used to connect, without use of excessive plastics material, and yet affording allowance for the usual departures of pipe-ends from true circularity and tolerances on nominal diameter, as well as accommodating axial and/or angular misalignment over and above any between the pipes allowed for in the design of the fitting.

10 Claims, 8 Drawing Figures

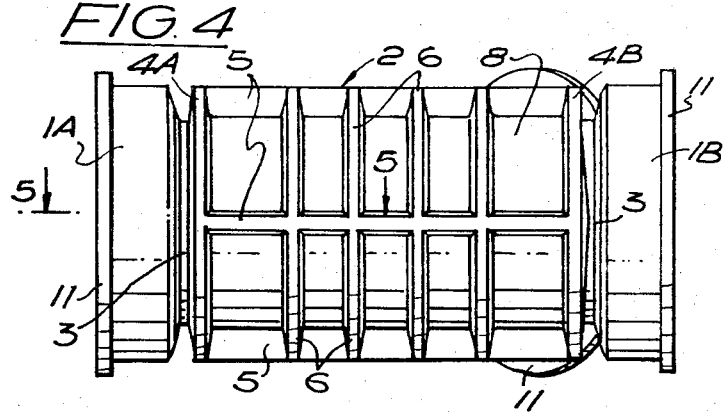
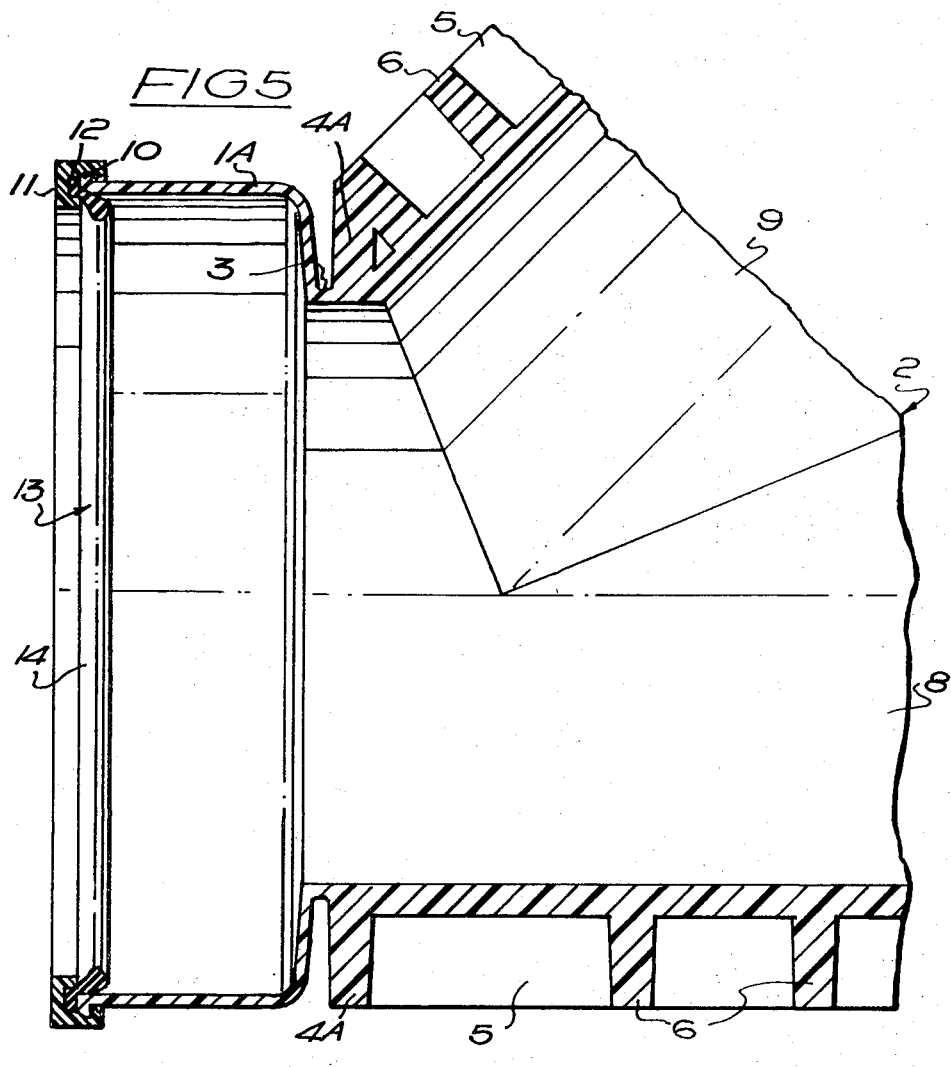

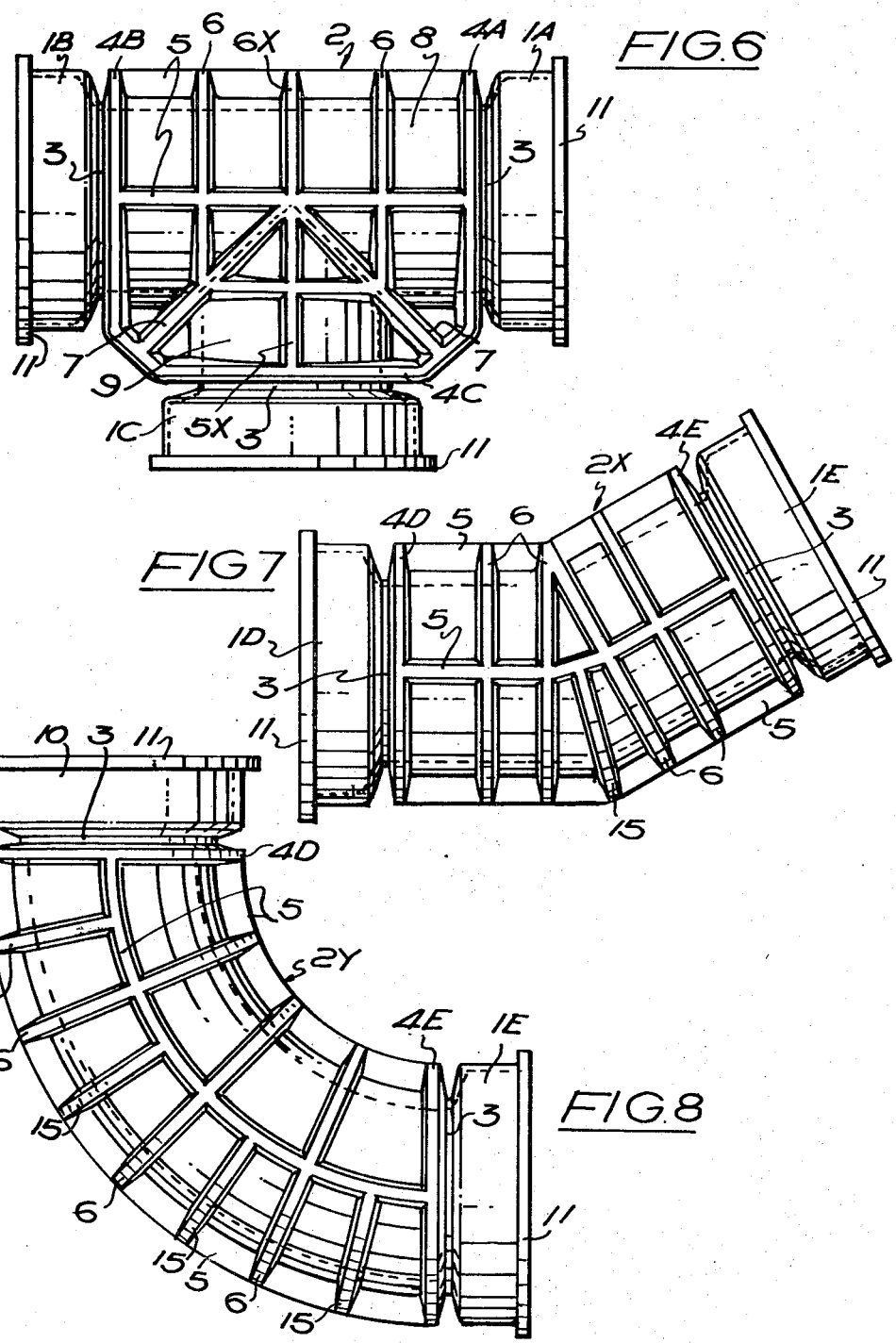

PIPE FITTINGS

This invention relates to pipe fittings, more particularly of plastics material and for connecting together plain-end (i.e., non-socketed) pipes of clayware, asbestos-cement, concrete, pitch-fibre or like rigid or semi-rigid pipes, such as are used for sewers, drains and cable conduit, and has for its object the provision of such a pipe fitting having a load-bearing capacity comparable with that of pipes which it is to be used to connect, without use of excessive plastics material, and yet affording allowance for the usual (at least with clayware pipes) departures from true circularity of the pipe-ends and tolerances on nominal diameter, as well as being able to accommodate axial and/or angular misalignment of the pipe-ends over and above any angular relationship between the pipes allowed for in the design of the fitting. Such a fitting can be a straight connection or a bend between two pipes, i.e., it will comprise a pair of sockets joined by an integral body portion, or it can be a junction for connecting three or more pipes, i.e., it will comprise at least three sockets joined by an integral body portion, each socket — in either case — being provided with means for effecting sealing round an inserted pipe-end.

According to the present invention, a pipe fitting for connecting plain-end pipes is formed of resilient plastics material and comprises sockets integrally joined to a hollow body by tubular necks, the body being stiffened by integral collars adjacent the necks, integral longitudinal ribs extending between the collars, and integral circumferential ribs connecting the longitudinal ribs. The tubular necks preferably have a wall thickness less than the wall thickness of the body.

The body being "caged" by the collars and ribs, it can be afforded a load-bearing capacity comparable with that of pipes which it is to be used to connect, without use of excessive plastics material, while the resilient flexibility of the sockets permits them to accommodate the usual departures from true circularity of the pipe-ends inserted in the sockets, and tolerances on nominal diameter of the pipes; and the flexibility of the necks between the sockets and the body permits the sockets to adapt themselves to accommodate axial and/or angular misalignment of the pipe-ends over and above any angular relationship between the pipes allowed for in the design of the fitting.

The thickness of the walls of the sockets is preferably similar to the thickness of the walls of the necks, i.e., less than the wall thickness of the body, so as to give added flexibility. However, each socket may have an external thickening round its mouth, for snap-on engagement by an inwardly-projecting rib on the outer limb of an annular channel-section locking member, the inner limb of which holds captive to the rim of the mouth of the socket an annular flange on a sealing ring having an annular sealing head projecting into the socket.

In the case of an oblique junction according to the invention the collars adjacent the necks of the pair of adjacent sockets are preferably integral with each other; while in the case of a square junction the collar adjacent the neck of the branch socket may be integral with the collars adjacent the necks of the other sockets, and ribs extending longitudinally of the branch may become a circumferential rib or ribs round the opposite part of the main portion of the body. Ribs are preferably also provided at both sides of the body along the or each plane bisecting the or each angle of 90° or less between the main and branch portions of the body.

As indicated previously, a fitting according to the invention may be a straight connection between two pipes — but this affords no advantage over having two sockets directly connected to each other, i.e., omitting the ribbed body altogether — or it may be a bend between two pipes, in which case the body may be a straight tubular portion, or two straight tubular portions at an angle, say for an angle between the sockets of up to 30° or a curved tubular portion, say for an angle between the sockets of between 30° and 90°.

A number of embodiments of the invention will now be described, by way of example only, with reference to the accompanying drawings, in which:

FIG. 4 is an elevation in the direction of the arrow X of FIG. 2;

FIG. 5 is an enlarged fragmentary section on the line 5—5 of FIG. 4; and

FIGS. 6 to 8 are plans, to the same scale as FIGS. 1 to 4, of respectively a square junction, a 30° bend, and a 90° bend, all in accordance with the invention.

Figure 1:
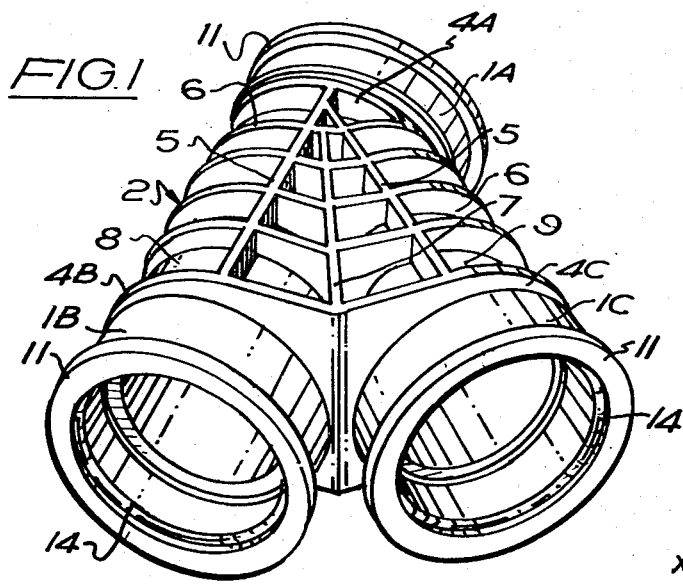
FIG. 1 is a perspective view of an oblique pipe junction in accordance with the invention.

In FIGS. 1 to 5, an oblique pipe junction for connecting plain-end pipes (not shown) is formed of resilient plastics material and comprises sockets 1A, 1B, 1C integrally joined to a hollow body 2 by tubular necks 3, the body being stiffened by integral collars 4A, 4B, 4C adjacent the necks, integral longitudinal ribs 5 between the collars, and integral circumferential ribs 6 connecting the longitudinal ribs. Ribs 7 are also provided at both sides of the body 2 along the plane bisecting the angle between the main portion 8 and the branch portion 9 of the body. The collars 4B, 4C adjacent the necks 3 of the pair of adjacent sockets 1B, 1C are integral with each other.

The tubular necks 3 have a wall thickness less than the wall thickness of the body 2, and the thickness of the walls of the sockets 1A, 1B, 1C is similar to the thickness of the walls of the necks, but (as illustrated by FIG. 5) each socket has an external thickening round its mouth 10 for snap-on engagement by an inwardly projecting rib on the outer limb of an annular channel-section locking member 11, the inner limb of which holds captive to the rim of the mouth of the socket an annular flange 12 on a sealing ring 13 having an annular sealing head 14 projecting into the socket.

Figure 2:
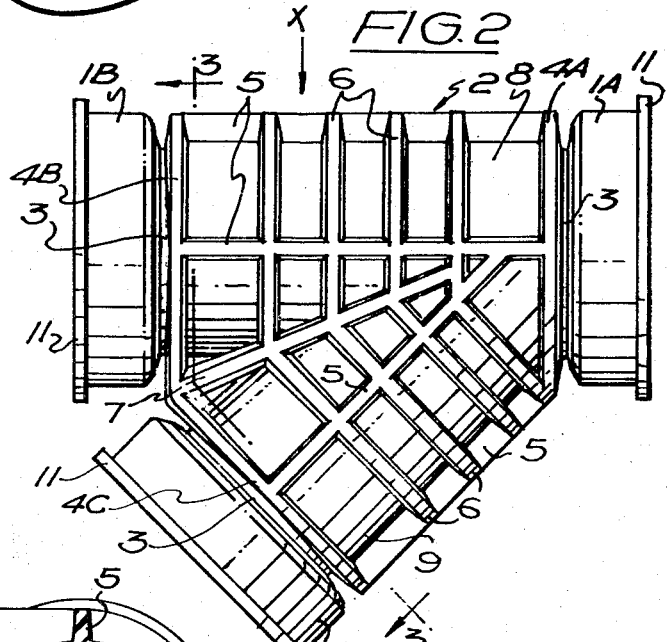
FIG. 2 is a plan of the pipe junction of FIG. 1.
Figure 3:
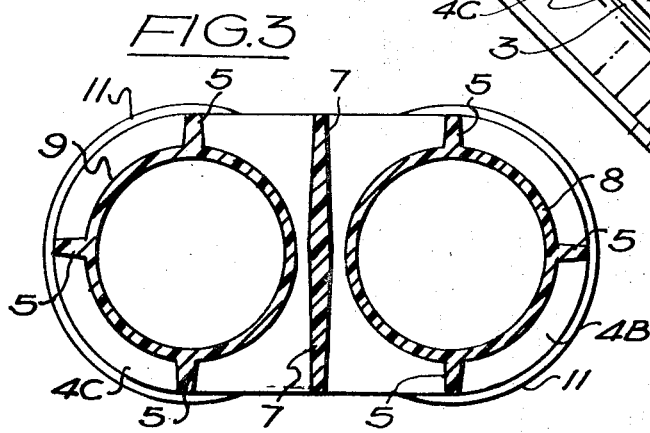
FIG. 3 is a section from the line 3—3 of FIG. 2.

The body 2 being "caged" by the collars 4A, 4B, 4C and ribs 5, 6, 7, it can be afforded a load-bearing capacity comparable with that of pipes (e.g., of clayware) which it is to be used to connect, without use of excessive plastics material (and some plastics material can be saved, if desired, by causing the collars 4B, 4C and the ribs 6 to conform more closely to the body portions 8, 9 than as shown in FIGS. 1 to 3), while the resilient flexibility of the sockets 1A, 1B, 1C permits them to accommodate the usual (especially in clayware pipes) departures from true circularity of the pipe-ends (not shown) inserted in the sockets, and tolerances on nominal diameter of the pipes; and the flexibility of the necks 3 permits the sockets to adapt themselves to accommodate axial and/or angular misalignment of the pipe-ends over and above the angular relationship between the pipes allowed for in the design of the junction.

In FIG. 6 like reference numerals represent like parts, the only appreciable difference being that, because the junction is a square junction as against the oblique junction of FIGS. 1 to 5, the collar 4C of the branch portion 9 of the body 2 is integral with both collars 4A, 4B of the main portion 8, the longitudinal ribs 5X (only one visible) of the branch portion become one circumferential rib 6X round the opposite part of the main portion, and ribs 7 are provided along each plane bisecting each angle of 90° between the main and branch portions of the body.

In FIG. 7, a 30° bend has sockets 1D, 1E, integrally joined to a bent hollow body 2X by tubular necks 3, the body being stiffened by integral collars 4D, 4E, integral longitudinal ribs 5 between the collars, and integral circumferential ribs 6 and a part-circumferential rib 15. The details of the sockets 1D, 1E are the same as those shown in FIG. 5.

In FIG. 8, a 90° bend has sockets 1D, 1E integrally joined to a curved hollow body 2Y by tubular necks 3, the body being stiffened by integral collars 4D, 4E, integral longitudinal ribs 5, and integral circumferential ribs 6 and part-circumferential ribs 15, the details of the sockets 1D, 1E again being the same as those shown in FIG. 5.

What I claim is:

1. A pipe fitting formed of resilient plastic material for connecting plain-end pipes comprising: a relatively rigid wall defining a hollow body; at least two relatively rigid sockets integrally joined to said hollow body; tubular necks joining said sockets to said hollow body, said necks having a thin wall thickness relative to said body, said thin wall being flexible; integral annular collars formed on said body adjacent said necks; integral longitudinal ribs extending between and interconnecting said collars; and integral circumferential ribs interconnecting the longitudinal ribs in the area between said collars; whereby said body is stiffened between said necks and flexing of the necks may cause a corresponding rotation of said sockets about an axis perpendicular to the axis of said pipes thereby accommodating at least some misalignment of said pipes while maintaining the integrity of the seal between said pipes and said sockets.

2. A pipe fitting as in claim 1, wherein the thickness of the walls of the sockets is substantially the same as the thickness of the walls of the necks.

3. A pipe fitting as in claim 2 wherein each socket comprises an external thickening relative to said socket around the mouth, an annular channel-section locking member for snap-on engagement to said thickening, said locking member comprising an outer and an inner limb, an inwardly-projecting rib on said outer limb, a sealing ring, an annular flange on said sealing ring held to the outer face of the mouth of said socket by said inner limb, and an annular sealing head on said annular flange, said sealing head having a portion projecting into said socket with said pipes to thereby seal the same.

4. An oblique pipe junction formed of resilient plastic material for connecting plain-end pipes comprising: a relatively rigid wall defining a hollow body; at least three relatively rigid sockets integrally joined to said hollow body including a pair of adjacent sockets; flexible tubular necks joining said sockets to said hollow body, integral annular collars formed on said body adjacent said necks; the collars adjacent the necks of the pair of adjacent sockets being integrally connected with each other to resist relative movement therebetween; integral longitudinal ribs extending between and interconnecting said collars; and integral circumferential ribs interconnecting the longitudinal ribs in the area between the collars; whereby said body is stiffened between said necks and flexing of the necks may cause a corresponding rotation of said sockets about an axis perpendicular to the axis of said pipes thereby accommodating at least some misalignment of said pipes while maintaining the integrity of the seal between said pipes and said sockets.

5. An oblique pipe junction as in claim 4, wherein ribs are also provided at both sides of the body along the plane bisecting the angle between the main and branch portions of the body.

6. The pipe junction of claim 4 wherein said necks have a thin wall thickness relative to said body that provides the flexibility.

7. A pipe junction formed of resilient plastic material for connecting plain-end pipes extending at substantially 90° to each other comprising: a relatively rigid wall defining a hollow body having at least three branches; at least three relatively rigid sockets integrally joined to said hollow body at said branches; flexible tubular necks joining said sockets to said hollow body; integral annular collars formed on said body adjacent said necks; integral longitudinal ribs extending between and interconnecting said collars; integral circumferential ribs interconnecting the longitudinal ribs in the area between the collars, said collars being integrally connected to each other adjacent the necks to resist relative movement therebetween; whereby said body is stiffened between said necks and flexing of the necks may cause a corresponding rotation of said sockets about an axis perpendicular to the axis of said pipes thereby accommodating at least some misalignment of said pipes while maintaining the integrity of the seal between said pipes and said sockets.

8. The pipe junction of claim 7 wherein said necks have a thin wall thickness relative to said body that provides the flexibility.

9. A square pipe junction as in claim 8, wherein ribs are also provided at both sides of the body along each plane bisecting each angle of 90° between the main and branch portions of the body.

10. A pipe junction as in claim 7, wherein at least one rib extending longitudinally of one of the branches becomes a circumferential rib surrounding the body opposite to said branch.

* * * * *